Patented Oct. 31, 1939

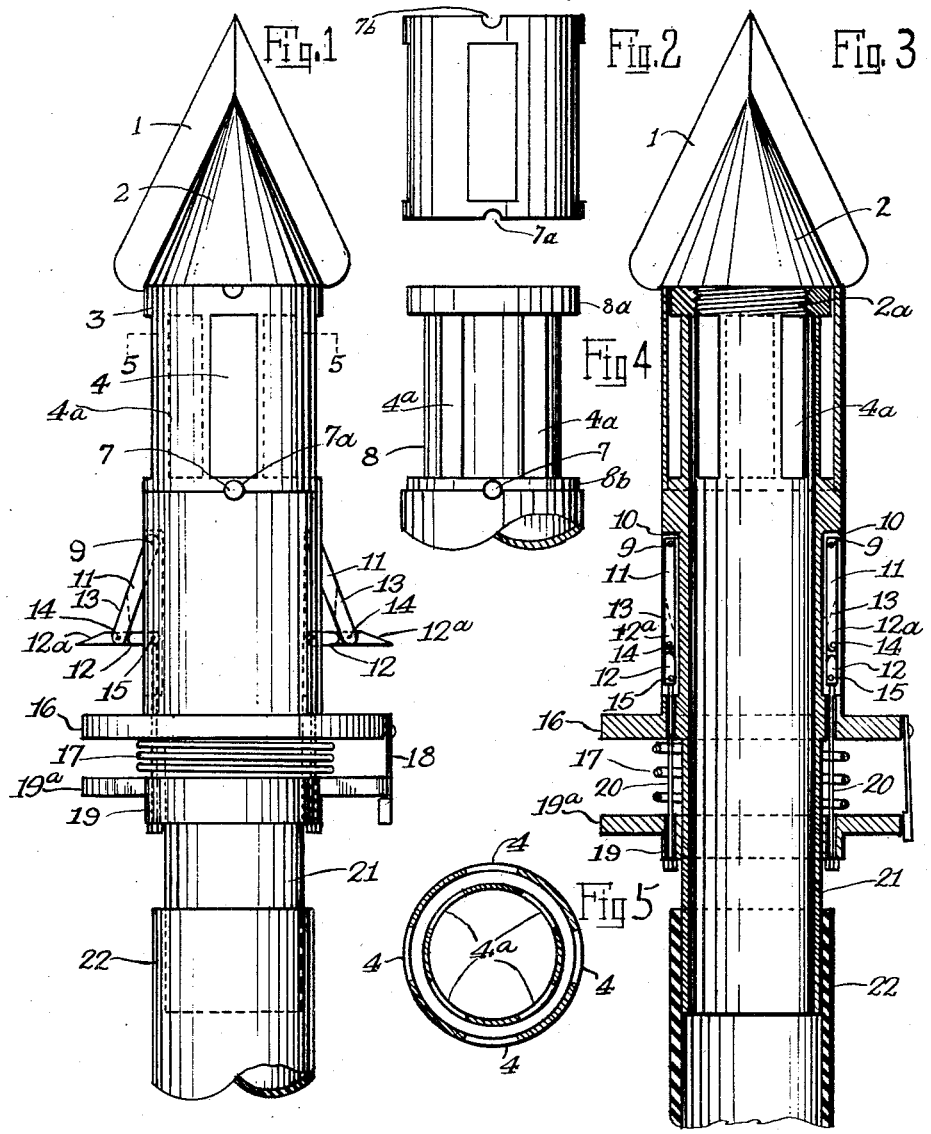

2,178,129

UNITED STATES PATENT OFFICE 2,178,129

SLAUGHTERING KNIFE

John Allison Wilson, South Pasadena, Calif.

Application June 19, 1936, Serial No. 86,113

3 Claims. (Cl. 17—1)

My invention relates to improvements in slaughtering devices such as those shown in patents to Wilson, 1,428,672, patented Sept. 12, 1922, and 2,001,232, patented May 14, 1935.

The primary object of this invention is to simplify the entire arrangement, reducing the number of parts in the knife.

Another object of my invention is to provide a slaughtering device which can be easily and thoroughly cleaned, simple and inexpensive to manufacture and to operate and one which draws the blood through the pump to an open tank for storage or to an open container for edible purposes, requiring no special tanks, no vacuum pump or compressor.

Other objects of this invention will appear in the following detailed description taken in connection with the drawing forming a part of this specification, in which drawing:

Figure 1 is an elevation of the improved sticking knife used in the improved device.

Figure 2 represents the shield to be placed around the ports in the stem of the knife.

Figure 3 is a vertical longitudinal section through the improved sticking knife.

Figure 4 is an elevation of the upper part of the improved knife with the outer shield removed.

Figure 5 is a section taken along the line 5—5 of Figure 1.

The improved sticking knife clearly shown in Figures 1, 2, 3, 4 and 5 of the drawing includes a hollow tubular stem 21 having its upper end internally threaded for the reception of the externally threaded head 2a formed on the lower end of the cone 2 into which the blade 1 is securely fastened, in a slot in the cone 2, by means of a rivet. The blade 1 may be of any desired configuration and as shown is shaped like the point of an arrow. An upper portion of the tube 21 is reduced in size as shown at 8 in Figure 3; and in that portion so reduced, there are longitudinal ports 4a placed at equal distances around the tube. At the top of the tube 21 and at the bottom of that portion of the tube 21 which is reduced are rings 8b and 8a somewhat smaller than the main part of the tube 21, around which is placed a shield 3; there are longitudinal ports 4 placed at equal distance around the shield 3, the shield being so placed that as shown by the sectional view shown in Figure 5, the ports 4 are situated opposite the spaces between the ports 4a and are held in that position by means of the pin 7 made fast in the tube 21; a semicircular notch 7a being cut in the lower edge of the shield fits the upper radius of this pin; a like notch 7b is cut in the upper edge of the shield 3 to facilitate assembling, as by this arrangement either end of the shield may be placed at the bottom. The cone 2 is of the same diameter at its base as the diameter of the shield 3; therefore, when the shield 3 is in its place and the cone 2 is screwed into its place the shield will be held firmly with the parts of its walls that are between its ports situated directly outside of the ports 4a in the tube 21, which arrangement keeps the flesh surrounding the wound away from the ports 4a in the tube 21 and allows the blood to flow through ports 4a. At a distance below the shield is placed a disk 16 the purpose of which is to stop the thrust of the knife at a certain depth; above the disk 16 there is a pair of diametrically opposed longitudinally extending grooves 10 which form recesses into which the links 11 and the leaves 12 and the projections 12a are drawn after the animal has been bled. Links 11, leaves 12 and the projections 12a are designed for the purpose of holding the knife in place in the wound. The links 11 are pivotally connected to the walls of the tube 21, as at 9; the leaves 12 are pivotally connected as at 15 to the upper ends of the rods 20; links 11 and leaves 12 of each pair are hingedly connected together as at 14; and the lower ends of the rods 20 are firmly fastened to the slidably mounted collar 19 which forms means for operating the leaves and links. Leaf 12 of each pair has a relatively narrow portion 12a which extends from a point near the middle of the leaf to the outer extremity. The leaf is pivoted by means of the reduced portion near the middle, to the link 11, which is slotted at 13 so as to form a fork to receive the leaf 12 when the link and the leaf lie in a straight line. When the link and the leaf lie in this position, the pins, 9, 14 and 15 are not in line as the pin 14 is placed farther out than pins 9 and 15, which will cause the link and leaf to swing outwardly and not inwardly when upward pressure is exerted against them. When the rods are moved upwardly as in Figure 1, the leaves 12 and the links 11 will swing outwardly and the projections 12a will penetrate the walls of the wound serving to hold the device securely in place. When the rods 20 are moved downwardly as in Figure 3, the projections 12a will be drawn into slots 13 and the links 11 and the leaves 12 will be drawn into the grooves 10. The collar 19 is operated by means of the projections 19a extending therefrom, by the hand of the operator. After the knife is thrust into the throat of the animal by the hand of the operator, the hand will glide along the tube 21 and contact the projections 19a, pushing the collar 19 upward, compressing the spring 17, causing the rods 20 to move upwardly until the spring catch 18 will hold the collar in place. After the animal has been bled the operator will release the spring catch 18 and the force of the spring 17 will move the collar downward, causing the rods to move downward, withdrawing the projections 12a from the walls of the wound, allowing the device to be removed from the wound. The tube 21 is reduced in diameter below the disk 16 to allow the collar 19 to slide, and below the collar a suction hose is fastened.

To operate this device, the operator first connects a suction hose at 21, then thrusts the knife into the throat of the animal until the disk 16 is pressed against the skin, then presses upward against the projections 19a of the collar 19 until the spring catch 18 securely latches upon the projection 19a; he can then let loose of the knife until the animal is bled, when he will release the catch 18 and the spring 17 will act upon the collar 19, removing the projections 12a, and allowing the knife to be withdrawn.

I am aware that prior to my invention devices have been made, designed to be used in connection with a method and apparatus for removing the blood from animals in process of slaughtering, invented by me and patented Sept. 12, 1922, under Patent Number 1,428,672, also Patent Number 2,001,232, issued May 14, 1935. I therefore do not claim such combination broadly, but I claim:

1. A slaughtering knife comprising a hollow stem adapted to convey blood, a cutting blade attached at the upper end of said stem, said stem having apertures below said cutting blade to admit blood to the interior of the stem, said stem having oppositely disposed longitudinally extending grooves formed on the exterior thereof below said apertures, hingedly connected links, leaves and rods, each of said links being pivoted within one of said grooves and pivoted to one of the leaves at a point intermediate the ends of the leaf, and a reciprocable collar surrounding said stem below said links and leaves, and fastened to said rods, said links, leaves, rods and collar being so disposed that said collar, in its upper position, causes said leaves to project outwardly from the stem, and, in its lower position, causes said leaves to lie in said grooves.

2. In an animal-slaughtering device, a knife comprising a hollow stem, a blade carried by the stem, said stem having a part adjacent said blade of reduced diameter and circumferentially spaced ports on said part, a ring at top and a ring at bottom of said part, said rings having a diameter larger than said part and smaller than said stem, and a removable cylindrical shield, having a turning fit on said rings and provided with circumferentially spaced ports, said shield having its ports lying opposite the closed portions of the reduced part of said stem, so as to prevent flesh particles from entering the hollow stem.

3. A slaughtering knife comprising a hollow stem adapted to convey blood, a cutting blade attached at the upper end of said stem, said stem having apertures below said cutting blade communicating with the inside of said stem, said stem having oppositely disposed, longitudinally extending grooves on the exterior thereof below said apertures, hingedly connected links, leaves and rods, each of said links being pivoted within one of said grooves and pivoted to one of the leaves at a point intermediate the ends of the leaf, so that the leaves may be extended or retracted within the grooves, a reciprocable collar surrounding said stem below said links and leaves, and fastened to said rods, a disk surrounding said stem and fixedly mounted below said links and leaves, a spring between said collar and disk urging said collar downwardly, and latch means secured to said disk and releasably engaging said collar so as to releasably hold said collar in its upper position and the leaves in their extended position.

JOHN ALLISON WILSON.